US011954072B2

(12) United States Patent
Bhattacharya et al.

(10) Patent No.: US 11,954,072 B2
(45) Date of Patent: Apr. 9, 2024

(54) SYSTEMS AND METHODS FOR BIDIRECTIONAL CONTENT SYNCHING AND COLLABORATION THROUGH EXTERNAL SYSTEMS

(71) Applicant: Open Text SA ULC, Halifax (CA)

(72) Inventors: Srijan Bhattacharya, Waterloo (CA); Brian Alexander Jewell, Kitchener (CA); Robert David James Reynolds, Kitchener (CA)

(73) Assignee: Open Text SA ULC, Halifax (CA)

( * ) Notice: Subject to any disclaimer, the term of this patent is extended or adjusted under 35 U.S.C. 154(b) by 263 days.

(21) Appl. No.: 16/158,607

(22) Filed: Oct. 12, 2018

(65) Prior Publication Data

US 2020/0117725 A1    Apr. 16, 2020

(51) Int. Cl.
| | |
|---|---|
| G06F 16/178 | (2019.01) |
| G06F 16/176 | (2019.01) |
| G06F 16/18 | (2019.01) |
| H04L 67/02 | (2022.01) |

(52) U.S. Cl.
CPC .......... *G06F 16/178* (2019.01); *G06F 16/176* (2019.01); *G06F 16/1873* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 9,998,446 B2 | 6/2018 | Branden et al. | |
| 2002/0059425 A1* | 5/2002 | Belfiore | G06F 9/54 709/226 |
| 2008/0010322 A1* | 1/2008 | Lee | G06F 16/178 |
| 2011/0099420 A1* | 4/2011 | MacDonald McAlister | G06F 11/3006 714/6.32 |

(Continued)

OTHER PUBLICATIONS

Sheldon, Tom; "Polling"; Linktionary.com: Networking Defined and Hyperlinked; Big Sur Multimedia; 2001; retrieved on Jun. 10, 2021 from http://www.linktionary.com/p/polling.html (Year: 2001).*

(Continued)

*Primary Examiner* — Alex Gofman
*Assistant Examiner* — Umar Mian
(74) *Attorney, Agent, or Firm* — Sprinkle IP Law Group

(57) ABSTRACT

A content server can function as the master record keeper even if a file or folder that it manages in an enterprise computing environment is shared externally, for instance, through a cloud system. To mitigate network security risks, the content server polls, from behind a firewall, an event service of the cloud system. The event service, in response, can communicate events indicating changes to the shared content to the content server. The content server can interpret the events and determine whether to take any appropriate action, for example, updating an audit log to include an event and/or updating the managed content to reflect the changes. Likewise, the content server can communicate any change to the managed content to the cloud system through the event service. In this way, the managed content in the enterprise computing environment and the shared content in the cloud system are bidirectionally synced.

19 Claims, 9 Drawing Sheets

(56) References Cited

U.S. PATENT DOCUMENTS

| | | | | |
|---|---|---|---|---|
| 2011/0252071 | A1* | 10/2011 | Cidon | G06F 16/178 707/802 |
| 2013/0013560 | A1* | 1/2013 | Goldberg | G06Q 10/101 707/634 |
| 2013/0179947 | A1* | 7/2013 | Kline, III | H04L 63/0823 726/4 |
| 2014/0052864 | A1* | 2/2014 | Van Der Linden | H04L 47/70 709/226 |
| 2015/0039556 | A1 | 2/2015 | MacKenzie et al. | |
| 2015/0101021 | A1* | 4/2015 | McErlean | G06F 8/61 726/4 |
| 2015/0310188 | A1* | 10/2015 | Ford | G06F 21/10 726/28 |
| 2016/0277368 | A1 | 9/2016 | Narayanaswamy et al. | |
| 2017/0177613 | A1* | 6/2017 | Sharma | G06F 21/45 |
| 2017/0193001 | A1* | 7/2017 | Agrawal | G06F 40/166 |
| 2018/0357294 | A1* | 12/2018 | Zhang | G06F 16/27 |
| 2019/0080053 | A1* | 3/2019 | Shiibashi | G06F 16/27 |

OTHER PUBLICATIONS

"Event"; FOLDOC: Free Online Dictionary of Computing; published Feb. 9, 2000; retrieved Jun. 10, 2021 from http://foldoc.org/event (Year: 2000).*

"Implementing cryptography with Bouncy Castle APIs | PrimeKey" ; accessed Nov. 18, 2021 from https://www.primekey.com/solutions/implementing-cryptography/ (Year: 2021).*

Copy. (n.d.) McGraw-Hill Dictionary of Scientific & Technical Terms, 6E. (2003). Retrieved Mar. 10, 2022 from https://encyclopedia2.thefreedictionary.com/copy (Year: 2003).*

"Account". Microsoft Computer Dictionary. Microsoft Press. 2002. p. 14. (Year: 2002).*

"Pull technology." Computer Desktop Encyclopedia. The Computer Language Company Inc. Accessed Apr. 6, 2023 from https://www.computerlanguage.com/results.php?definition=pull (Year: 2023).*

"Push technology." Computer Desktop Encyclopedia. The Computer Language Company Inc. Accessed Apr. 6, 2023 from https://www.computerlanguage.com/results.php?definition=push%20technology (Year: 2023).*

European Search Report issued for European Patent Application No. 19202692.0, dated Dec. 4, 2019, 8 pages.

Office Action for European Patent Application No. 19202692.0, dated Dec. 8, 2021, 10 pgs.

* cited by examiner

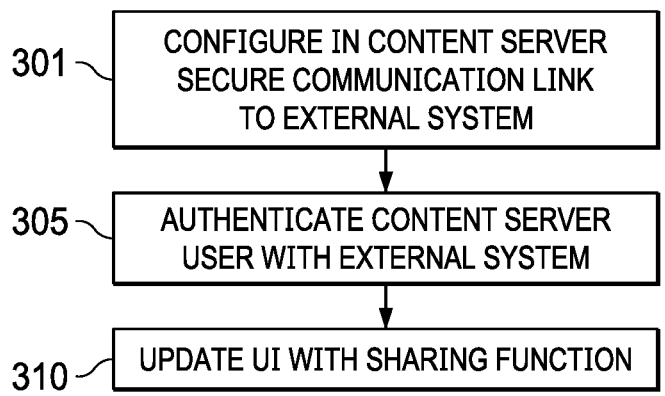
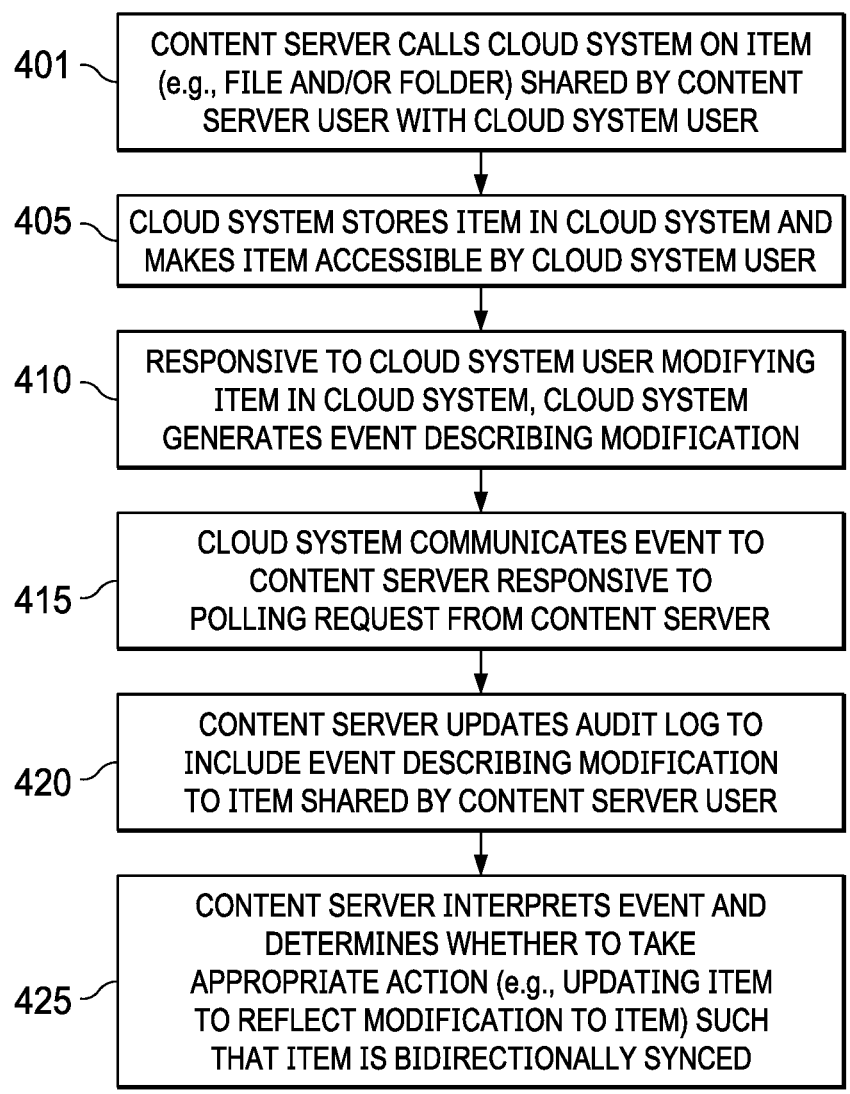

| Enterprise > Business Proposals > East Dam Project | | | | | | |
|---|---|---|---|---|---|---|
| ▽ ✚ ⓘ | 710 730 | 🗀 East Dam Project » | | | 💬 ☆ | ↗ |
| ☐ Copy link | Share » Edit » View Permissions | Download Reserve Copy Move | Add version ••• | | | |
| ☐ 📄 3004WaterPump | Email Link ~712 | | 822 KB | 11/09/2017 6:11:54 PM | ☆ | |
| ☐ 📄 Construction-Sch | Share externally ~714 | | 57 KB | 11/09/2017 6:11:54 PM | ☆ | |
| ☐ 📄 Project Staffing Policies.docx | | | 12 KB | 11/16/2017 6:30:50 PM | ☆ | |
| ☐ 📄 Garden Project Checklist.docx ~706 | | | 23 KB | 11/09/2017 6:11:56 PM | ☆ | |
| ☐ 📄 mercbmp.docx ~701 | | | 645 KB | 11/09/2017 6:11:56 PM | ☆ | |
| ☑ 📄 Request-for-Proposal.docx | | | 34 KB | 11/16/2017 2:42:46 PM | ☆ | |
| ☐ 📄 RVS-DN-Spec-Guide-2011.docx | | | 23 KB | 11/09/2017 6:11:55 PM | ☆ | |
| ☐ 📄 SampleSchedule.pdf | | | 510 KB | 11/09/2017 6:11:55 PM | ☆ | |
| ☐ 📄 Yields.xlsx | | | 11 KB | 11/09/2017 6:11:54 PM | ☆ | |

9 items

SYSTEMS AND METHODS FOR BIDIRECTIONAL CONTENT SYNCHING AND COLLABORATION THROUGH EXTERNAL SYSTEMS

TECHNICAL FIELD

This disclosure relates generally to the field of enterprise information management (EIM). More particularly, this disclosure relates to EIM systems operating in networked computing environments. Even more particularly, this disclosure relates to bidirectional synching and collaboration of content managed by an EIM system in an enterprise computing environment and shared through an external system that operates in a cloud computing environment.

BACKGROUND OF THE RELATED ART

Enterprise information management (EIM) is a particular technical field in Information Technology (IT). EIM combines many enterprise class systems such as enterprise content management (ECM), business process management (BPM), customer experience management (CEM), and business intelligence (BI). An EIM system may utilize a content server to, among other things, store, and manage an organization or enterprise's digital assets such as content and documents (which are collectively referred to herein as "managed objects"). To protect these managed objects, the content server would operate behind the enterprise's firewall and be particularly configured so that only authorized users may have secure access to the managed objects. Often, content servers are located on the premises (e.g., a server machine or machines on which a content server is implemented would be physically installed in a building) of the organization or enterprise. This is sometimes referred to as "on-prem."

As an enterprise continues to grow, so does the need for enterprise users to collaborate and/or share files with external users. Since external users are generally not authorized to access the enterprise's EIM system, they cannot view and/or edit any file managed by the enterprise's content server. When a need arises for an external user to review and/or edit a file, one common option is for an enterprise user to log into the enterprise content server from within the enterprise network where the content server resides, retrieve the file, and share a copy the file with an external user by email or through a cloud-based storage system that is open to the public.

Once that copy is shared outside of the enterprise network, it is no longer under management by the content server. The content server has no way of tracking the shared copy, getting the shared copy back to the content server, and/or updating the original file to reflect any changes made to the shared copy.

SUMMARY OF THE DISCLOSURE

A goal of the invention is to improve EIM systems by providing a safe and secure way to expose content managed by an "on-prem" EIM system operating in an enterprise computing environment. This goal can be achieved in a content server running on a feature rich content server platform where content server users can safely and securely share and collaborate on EIM-managed content with external participants through an external system such as a cloud-based storage system. In this disclose, the term "platform" broadly refers to a particular structure on which multiple software products (i.e., applications) can be built within the same technical framework. The structure, in this case, includes both hardware and software components.

OpenText™ Content Suite, which includes OpenText Content Server ("Content Server") and which is available from OpenText, headquartered in Canada, can be a non-limiting example of a feature rich content server platform on which some embodiments disclosed herein can be implemented. For the purpose of illustration, and not of limitation, OpenText Core ("Core") can be a non-limiting example of an external system (i.e., a system that is external to an EIM system or content server operating in an enterprise computing environment). Core operates in a cloud computing environment and provides personal cloud storage for securely sharing and collaborating on files. These files are stored by Core in the cloud computing environment (e.g., on a tenant server computer in a multitenancy platform operated by a cloud-hosting service provider such as OpenText Cloud) which is separate and independent from the enterprise computing environment. Skilled artisans appreciate that embodiments disclosed herein are not limited to Core and can work well with any external systems, including any third-party cloud storage system operating in a cloud computing environment external to an EIM system disclosed herein operating in an enterprise computing environment behind a firewall thereof.

In some embodiments, a method of bidirectional content synching and collaboration of content managed by an EIM system (e.g., a content server) in an enterprise system and shared through an external system (e.g., a cloud system) in a cloud computing environment can include the content server making an application programming interface (API) call to the cloud system. The API call can be made in response to an instruction from a content server user to share an item (e.g., a file or a folder managed by the content server) with a cloud system user. The API call can contain information that identifies the content server user, the cloud system user, and the item to be shared.

Responsive to the API call, the cloud system can store a version of the item for an account of the content server user in the cloud system and make the version of the item in the cloud system accessible by the cloud system user through an account of the cloud system user in the cloud system. The cloud system can store the version of the item locally (in the cloud computing environment) and can maintain its own audit log for tracking changes to the version of the item stored in the cloud system.

In some embodiments, the cloud system can be enhanced with a centralized event service that is operable to monitor and handle events across the entire infrastructure of the cloud system. For example, when the cloud system user modifies the version of the item shared by the content server user and stored in the cloud system, an event describing the modification of the version of the item by the cloud system user is generated. This event is not communicated to the content server immediately by the event service. Rather, the event can be stored in a database of the cloud system and the event service is operable to wait for a polling request from the content server and communicate the event to the content server in response to the polling request from the content server.

The event includes information about the modification of the version of the item by the cloud system user. This information allows the content server to update its audit log to include the event. Further, the content server can interpret the event and determine whether to take any appropriate action. An example of an action can be updating the item managed by the content server in the enterprise computing environment to reflect the modification of the version of the item by the cloud system user such that the item managed by the content server in the enterprise computing environment is in sync with the version of the item in the cloud system. In some cases, the content server can interpret the event and determine not to take any action. For example, a file deletion event may be generated when the version of the item is deleted from the cloud system. The content server may interpret this event and determine that no action is needed. That is, deletion of a shared version of managed content from the cloud system does not necessarily cause the content server to delete the managed content as well.

For bidirectional synching, a change to the item managed by the content server in the enterprise computing environment can, likewise, be communicated by the content server to the cloud system. In some embodiments, this can entail determining, by the content server, whether the item managed by the content server in the enterprise computing environment has been modified (e.g., by the content server user or any authorized user in the enterprise computing environment) and, responsive to the item managed by the content server in the enterprise computing environment having been modified, making an API call to the cloud system with a delta made to the item managed by the content server. This delta can reflect the change to the item managed by the content server in the enterprise computing environment. Responsive to the API call, the cloud system can update the version of the item in the cloud system to reflect the delta made to the item managed by the content server such that the version of the item in the cloud system is in sync with the item managed by the content server in the enterprise computing environment.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3 is a flow chart illustrating a method of setting up a content server for external sharing according to some embodiments disclosed herein.

FIG. 4 is a flow chart illustrating a method of bidirectional content synching and collaboration according to some embodiments disclosed herein.

FIGS. 7A-7C depict diagrammatical representations of exemplary views of a content server user interface of a content server with an external sharing function according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
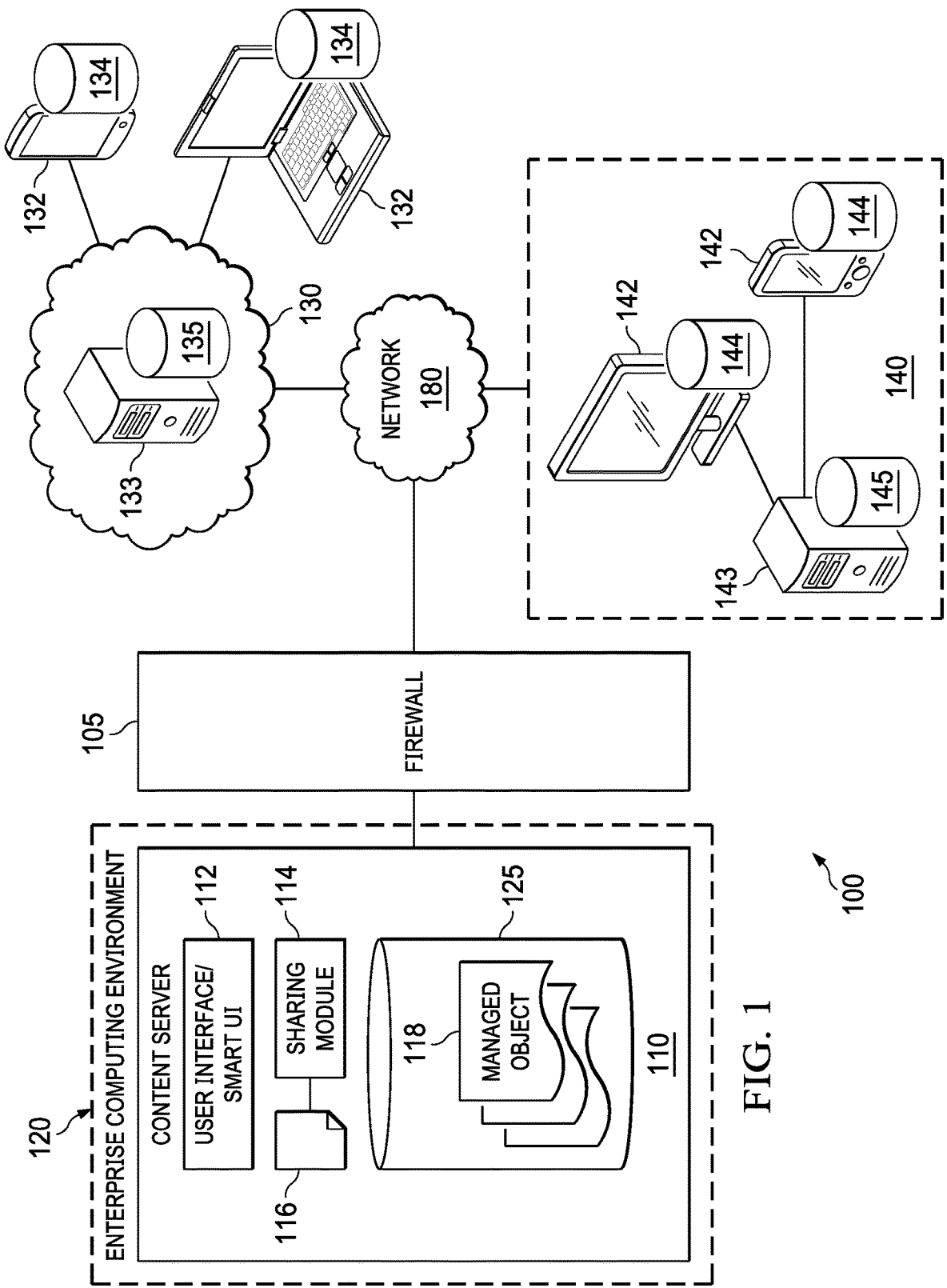
FIG. 1 depicts a diagrammatical representation of sharing repository content managed by a content server in an enterprise computing environment through external systems according to some embodiments disclosed herein.

FIG. 1 depicts a diagrammatical representation of system 100 for sharing content (e.g., managed objects 118) stored in a repository (e.g., repository 125) managed by a content server (e.g., content server 110) in an enterprise computing environment (e.g., enterprise computing environment 120) through external systems (e.g., external systems 130, 140) through the enterprise's firewall (e.g., firewall 105) over a network (e.g., network 180) according to some embodiments disclosed herein. In the example of FIG. 1, content server 120 further comprises a sharing module (e.g., sharing module 114), a tracking mechanism (e.g., tracking database or log file 116), and an enhanced UI (e.g., UI or smart UI 112). The operations and functionalities of these content server components are further described below.

Skilled artisans appreciate that a content server can be located "on-prem" in an enterprise computing environment or hosted in a cloud computing environment. Accordingly, FIG. 1 is meant to be exemplary and non-limiting.

Likewise, a system external to the content server can be an on-prem external system or a cloud-hosted external system. In the example of FIG. 1, external system 130 represents a cloud-hosted external system and external system 140 represents an on-prem external system. External system 130 can have server machine(s) 133 with storage(s) 135 accessible by user devices 132, each of which having non-transitory computer readable-medium 134. External system 140 can have server machine(s) 143 with storage(s) 145 accessible by user devices 142, each of which having non-transitory computer readable-medium 144.

As discussed above, in some cases, an enterprise user may need to collaborate and/or share files with external users. For example, a content server user "Engineer" may try to create a design specification for a new pump that will be delivered to a customer. The pump specification document is stored in the content server. However, Engineer needs some input from external contractors who will be supplying parts to the pump. Those contractors do not have access to Engineer's document in the content server, but Engineer needs them to be able to edit and make changes to the pump specification document. In this case, Engineer could make a copy of the pump specification document and either upload the copy to an external system accessible by the contractors or email the pump specification document to the contractors.

Either way, once the pump specification document is shared outside of the enterprise network, it is no longer under management by the content server and each of the contractors (external users) could freely view, modify, copy, store (e.g., in hosted or local storage), and even share it with other external users. The content server had no way of tracking the shared copy, getting the shared copy back to the content server, and/or updating the original file to reflect any changes made to the shared copy.

This kind of "copy-and-set-free sharing" can pose a security risk. Therefore, the sharing feature is usually disabled in a content server to prevent sharing certain files, folders, directories, etc.

In some embodiments, access to sharing features provided by content server 120 can be turned off by default. However, an administrator can enable sharing and assign sharing privileges to content server users through an administrator UI. Following the above example, the sharing privilege would allow Engineer to share the pump specification document stored in the content server with the contractors through a designated external system. Once shared, the pump specification document stored in the content server is locked to prevent changes/additions. The contractors can edit the copy stored on the external system. When the contractors have made their inputs to the copy stored on the external system, Engineer can bring the edited copy back to the content server. With this content sharing method, which is further explained below with reference to FIG. 2, the managed content is shared in one direction (from the content server to the external system) and synced back in another direction (from external system to the content server).

Figure 2:
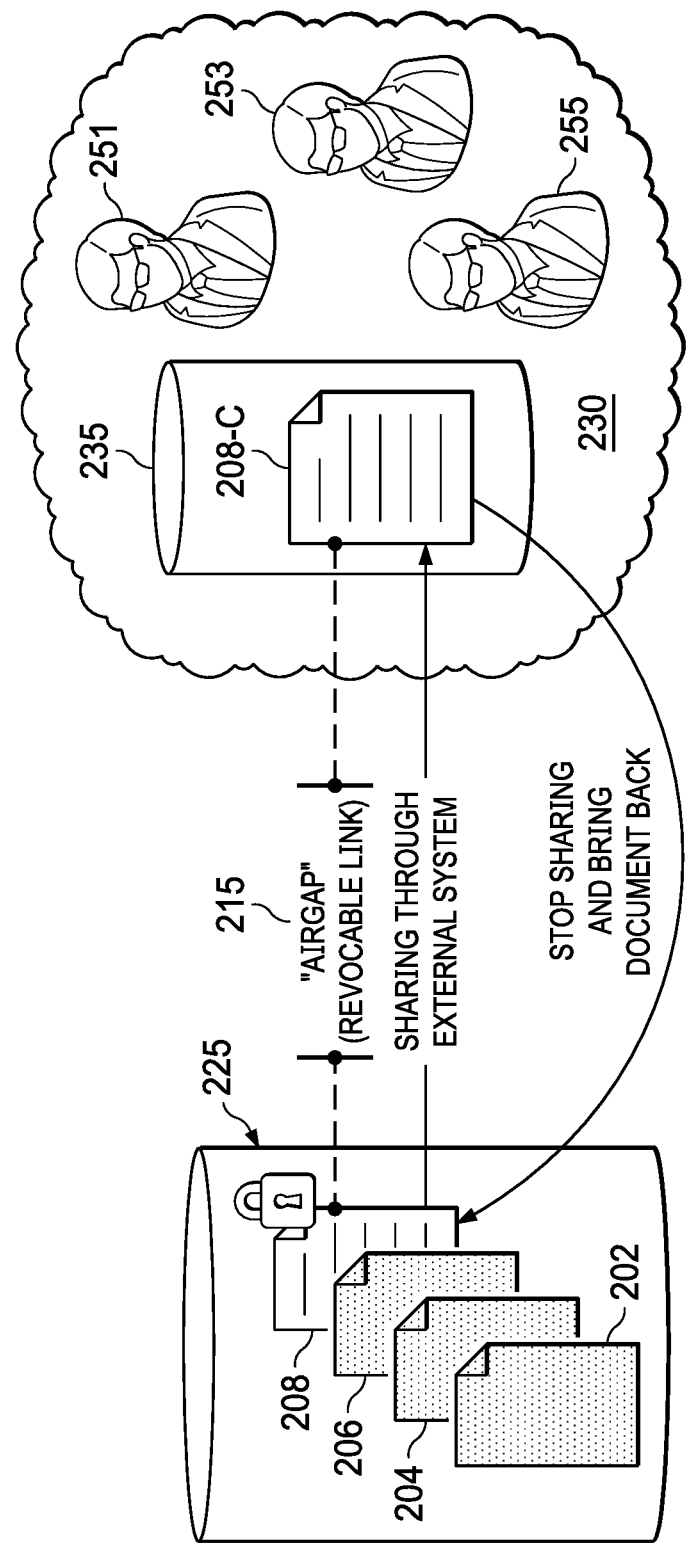
FIG. 2 depicts a diagrammatical representation of a data flow when repository content managed by a content server in an enterprise computing environment is shared through an external system and retrievable by the content server through a revocable link according to some embodiments disclosed herein.

FIG. 2 depicts a diagrammatical representation of a data flow when repository content managed by a content server in an enterprise computing environment is shared through an external system and retrievable by the content server through a revocable link according to some embodiments disclosed herein. In this example, repository 225 stored managed objects (e.g., documents 202, 204, 206, 208).

In some embodiments, using a content server UI, a user (referred to herein as the "originator") can select a document (e.g., document 208) stored in repository 225 and chooses to share the document through external system 230. The originator can identify participants (e.g., external users 251, 253, 255 of external system 230) using their email addresses (or email identifiers).

As will be explained below, in some embodiments, the content server is configured with a secure communication link to the external system. This allows the content server to provide a type-ahead style participant look-up function to identify external users who are already registered with the external system. In some embodiments, the external system may notify all participants and handle registration of new users.

In some cases, participants can also include internal users of the content server. The originator assigns a role for each participant, either as a contributor or a viewer. Further, while a document is used as an example here, the originator can choose to share a folder.

In the example of FIG. 2, a copy (e.g., document 208-C) of the document (e.g., document 208) selected by the originator (through a UI element on the content server UI) for external sharing is made and sent to the external system (e.g., external system 230). The external system stores the copy in its local storage (e.g., repository 235) and notifies the participants that the originator has shared the copy with them.

The external system may return to the content server a unique identifier (ID) generated by the external system to identify the copy internally. The content server is operable to store this unique ID from the external system along with its document ID for the original document in a tracking table, database, or log file (e.g., audit log 116). The original document stored in the repository managed by the content server and the copy stored on the external system (also referred to as a "document share") is linked through a revocable link (e.g., link 215) referred to as an airgap.

In this example, the original document (e.g., document 208) is marked and tagged, for instance, as "shared for collaboration" in the content server's repository (e.g., repository 225). This tag can help identify and track documents that have been shared. In some embodiments, audit log entries can be created in the content server for storing tracking share-related information in a tracking table, database, or log. At this time, the content server UI can be updated to reflect or otherwise indicate that the document (or folder) is shared externally and locked from editing.

The external system may notify all participants when a new document version has been added (by any of the participants). Further, the external system may notify all participants when something changes in the document share.

The originator can choose to "unshare" the document share through the content server UI. In some embodiments, unsharing a file share may cause the content server to retrieve the last version from the external system and add it as a new version in the repository managed by the content server. In turn, the external system may send notifications to all participants that the file share has been revoked and removes the file share from its storage.

As discussed above, the content server can communicate with the external system through a secure communication link or path. FIG. 3 is a flow chart illustrating a method of setting up a content server for external sharing through a secure communication link or path to an external system. Previously, it is very difficult to enable and manage external sharing from an ECM system or content server. This is because enterprise file synchronization and sharing (EFSS) is a highly complex functionality and requires complicated integration between the content server (inside of an enterprise) and endpoint systems (outside of the enterprise) and lengthy user setups for all involved. In this case, in some embodiments, only a one-time configuration is needed by an administrator of the content server. This allows for easy and fast integration and user setups. Further, by leveraging existing external systems, users of those systems do not need to learn how to interact with the content server in order to access content managed by the content server.

As a non-limiting example, an administrator of the content server can access an administrator UI to select an instance of a cloud-hosted external system (e.g., Core), depending upon where that instance (tenant) is hosted (e.g., on North American servers). The administrator can configure the content server with the tenant client ID and tenant client credential provided by the external system (301). These are needed for authentication (e.g., through OAuth authentication provided by a directory service such as OpenText Directory Service or OTDS). The external system's access and refresh tokens may be maintained in the content server. This can minimize the frequency by which the content server would need to re-authenticate with the external system. In some embodiments, the external system may support Active Directory Synchronization and Single Sign On authentication methods. Other authentication methods may also be possible.

In this example, when sharing through an external system, a content server user would authenticate with the external system as a tenant service user (305). The content server UI can then be updated to enable the external sharing function provided by the sharing module (310). At this point, the content server user can navigate to an item (e.g., a file or folder) in the repository and share it through the external system. In this example, the content server user has an edit permission on the item to add internal and/or external participants (e.g., in various roles such as collaborators, viewers, etc.) who can view and/or modify the item.

The content server is operable to receive, through the content server UI, an indication or instruction from a content server user to share an item in the repository with a collaborator. In response, the content server is operable to make a copy ("share") of the item, send the share to the external system (510), establish a link between the original and the share, and mark, lock, reserve, or otherwise preserve the original in the repository so that it cannot be modified, changed, or edited in any way.

The link between the original and the share can be established as follows. The external system may receive the share, assign a unique ID for internal use, store the share locally using the unique ID, and send the unique ID to the content server. The content server is operable to receive the unique ID and other information (see below examples of various types of data points collected) from the external system and store it in a tracking table, database, store, audit log, or any suitable data structure maintained by the content server. In some embodiments, the content server is operable to update the content server UI to indicate (e.g., by placing an icon next to the file or folder in the content server UI) that the original item in the repository is now shared and is locked and cannot be edited. That is, changes/additions to the version in the content server will not be allowed after it has been shared externally. Instead, all share participants (internal and external) will collaborate on the share that now resides on the external system.

It should be noted here that, while the method above describes sharing repository content managed by a content server in an enterprise computing environment externally with external participants who do not have access to the content server, sharing repository content with internal users will also work seamlessly. That is, users internal to the enterprise computing environment can share documents with internal users who are also a member of the external system. The content server UI may be further enhanced for internal users so that they have minimal interaction with the external system. For example, the content server UI can include a shared content widget that provides users who share content with easy access to view all the content they have shared. Through the same widget, users can also view content that has been shared to them. The shared content widget can be implemented as a menu item, a popup window, or a section or tile on a user home page. Other implementations are also possible. Content server users who have special privileges (e.g., a "Collaborator" privilege) on a shared document may edit the shared document directly from the content server (e.g., using Office Editor) without having to use the external system. Changes made to the shared document using Office Editor can be immediately added to the version of the shared document in the external system.

The method described above can be performed by a sharing module of the content server. As a non-limiting example, the sharing module is operable to utilize a table, such as Table 1 below, to keep track of information (e.g., OAuth2 tokens, IDs, etc.) that allow the content server to perform actions on behalf of its users. The sharing module is also operable to use the table to determine when a user is to be prompted for authentication.

TABLE 1

| Name | Type | Size | Null Status | Description |
|---|---|---|---|---|
| UserID | Number | 19 | Not Null | The user ID of the content server user to whom this authentication information belongs. |
| ProviderName | VarChar | 255 | Not Null | The name of the external system that issued the authentication information. |
| ProviderUserID | VarChar | 255 | Not Null | The user's user ID on the external system. |
| AccessToken | VarChar | | Null | The OAuth2 access token that was issued by the external system. |
| RefreshToken | VarChar | | Null | The OAuth2 refresh token that was issued by the external system. |
| ExpiryTime | Number | 19 | Not Null | The time the AccessToken expires (in seconds). |
| TokenType | VarChar | 255 | Null | The type of authentication token that was issued. |

As another non-limiting example, in some embodiments, the sharing module of the content server is additionally operable to track, or utilize a different table, such as Table 2 below, to keep track of all the documents that have been shared externally to an external system (e.g., OpenText Core).

TABLE 2

| Name | Type | Size | Null Status | Description |
|---|---|---|---|---|
| DataID | Number | 19 | Not Null | The ID of the content server item that is being shared. |

TABLE 2-continued

| Name | Type | Size | Null Status | Description |
|---|---|---|---|---|
| ProviderItemID | VarChar | 255 | Not Null | The ID of the item in the external system. |
| ProviderVersionID | VarChar | 255 | Not Null | The version ID of the item in the external system. |
| SharedVersion | Number | 19 | Not Null | The version number of the content server that is being shared. |
| SharedVersionID | Number | 19 | Not Null | The version ID of the content server item that is being shared. |
| SharedBy | Number | 19 | Not Null | The user ID of the content server user that shared the item. |
| SharedOn | Date | | Not Null | The date the content server item was shared. |

As discussed above, when a file (or folder) is shared from the repository to an external system, a link is established between the original file in the repository and the copy in the external system. The external sharing can be revoked (e.g., by the originator) at any time, severing the link between the original file in the repository and the copy in the external system. When this occurs, the latest version of the copy is retrieved from the external system (e.g., by the sharing module of the content server) and, in some embodiments, saved as a new version in the repository or used to replace the original version. An example of a process triggered by sharing revocation is described below.

In some cases, an originator (e.g., a content server or enterprise user who initially shared a file or folder (also referred to as a "share") in the content server with external user(s) through an external system) may navigate to a shared file or folder through a content server UI and instruct the content server to stop sharing the file or folder. The content server is operable to receive the user indication through the content server UI and take appropriate actions to stop sharing the file or folder (and hence revoking the previously established link between the original in the repository and the share in the external system).

These actions can include notifying the external system that the share privilege (as a viewer or collaborator) granted to a participant (i.e., a user of the external system) on a share has been revoked, retrieving the latest version of the share from the external system, and saving the retrieved version as a new version in the repository. Alternatively or additionally, the content server is also operable to replace the original in the repository with the retrieved version. In response to the notification from the content server, the external system is operable to delete the share and notify the participants of the share that the share is no longer accessible through the external system.

With the content sharing method described above, an external system can be utilized as an extension of a content server that resides in an enterprise computing environment and operates behind a firewall. This extension allows sharing from the content server and using the external system as a secure, user-friendly collaboration platform to provide external participants access to shared documents. For example, in a cloud-hosted external system such as Core, participants (internal as well as external) can readily access Core and collaborate on a document through Core, using Core's web client, mobile client, and desktop client apps running on disparate user devices. In some embodiments, files that are shared from the content server to the external system may be placed in the external system's user storage under a special folder name "My Content Server Shared Items." Other storage scenarios may also be possible.

To ensure security, communications between the content server and the external system may utilize the Representational State Transfer (REST) protocol. The content server is operable to utilize the external system's REST layer as the application programming interface (API) of choice for server-to-server interactions such as user lookup, share initiation, share revoke, etc. Further, the content server is operable to make all the outbound calls (e.g., REST API calls) to the external system. In this way, no inbound connection from the external system back into the content server may be required. That is, the external system never reaches into the content server.

In the above-described sharing scenarios, sharing from the content server may be manually driven by end users. This type of sharing scenarios can be described as "high touch," which means that a content server user shares content on a person-to-person basis and there are no fixed content sharing rules. The content server user can pick and choose "share-to" users (whether they are internal and/or external to the content server) and decide how the content (which is managed by the content server) is to be shared (e.g., view-only, edit, etc.) through an external system.

However, with the content sharing method described above, the managed content is shared in one direction (from the content server to the external system) and synced back in another direction (from external system to the content server). Although the content server can get the managed content (plus any changes made to the managed content while the managed content was shared through the external system) back into the repository behind the firewall, the original version of the managed content in the repository cannot be modified, changed, or edited in any way while the managed content is shared through the external system.

Another issue is that the content server had no way of tracking any changes made to the managed content while the managed content was shared through the external system. Although, as described above, the external system may log changes to the managed content while the managed content was shared through the external system, the data logged by the external system are internal to the external system and are not communicated to the content server when the share is revoked. This creates a gap in the record that the content server maintains for the managed content.

To address these and other issues, an object of the invention is to provide bidirectional content synching and true collaboration where content server users and external system users alike can collaborate on shared managed content contemporaneously. Another object of the invention is to enable a content server in an enterprise computing environment to function as the system of record and track all the changes made (by the content server users and/or the external users) to the shared content.

In this disclosure, "managed content" can refer to an item that is managed by an EIM system such as a content server and an "item" can be a file or a folder. When a folder is shared through an external system, the folder can be empty. If the folder is not empty, the content server can make a copy of the folder and its content and send the copy to the external system.

To allow content a server user and an external system user to collaborate on a shared item contemporaneously, the content server does not lock the item once it is shared. This means that the content server needs a mechanism to determine when the shared item is modified in the external system so that the content server can update its stored, original version to match. This mechanism must function well and timely, allowing for changes to be synchronized in, for instance, less than five seconds after the content modification has completed on the external system side. Further, this mechanism must be fault tolerant, guaranteeing that change events will not be missed.

In some embodiments, the content server is operable to leverage a new micro-service, referred to herein as an "event service," provided by an external system operating in a cloud computing environment (a "cloud system"). This cloud system does not reach into the content server. Rather, the content server is operable to poll the event service to get all events that an authorized user (e.g., a tenant service user) is subscribed for. An example of this process is provided below with reference to FIG. 4.

FIG. 4 is a flow chart illustrating a method of bidirectional content synching and collaboration according to some embodiments disclosed herein. The method can be triggered by an instruction from a content server user to share an item with a cloud system user. In response, the content server can make an API call to the cloud system (401). The API call can contain information identifying the content server user, the cloud system user, and the item.

Responsive to the API call, the cloud system can store a version of the item for an account of the content server user in the cloud system and make the version of the item in the cloud system accessible by the cloud system user through an account of the cloud system user in the cloud system (405). If the item is a folder, the API call can contain a folder name and the cloud system can create a cloud folder for the account of the content server user using the folder name and make the cloud folder accessible by the cloud system user through the account of the cloud system user in the cloud system. The cloud system can store the version of the item locally (in the cloud computing environment) and can maintain its own audit log for tracking changes to the version of the item stored in the cloud system.

A producer of events can be a component (e.g., a micro-service) within the cloud system that is not the monolith core of the cloud system. Each producer can be identified by a producer ID. Events can be generated by user-triggered actions. For example, when a cloud system user interacts with a client of the cloud system (e.g., through a web-based interface) and modifies a file or folder, that action generates an audit event that describes the action that the cloud system user took. The event generation mechanism can be generic. This means that events do not have to be triggered by a user and can also be triggered by automated processes. For example, if the cloud system has a record management rule that specifies deletion of a document after 30 days or based on a set of rules, then those changes to the state of the object would be stored (as events) in the event service as well.

In the example of FIG. 4, when the cloud system user (or any "shared-to" user permitted to access the item through the cloud system) modifies the version of the item shared by the content server user and stored in the cloud system, an event describing the modification of the version of the item by the cloud system user is generated (410). This event is not communicated to the content server immediately on the cloud system's own initiative. Rather, the event can be stored in a database of the cloud system and the event service is operable to wait for a polling request from the content server and communicate the event to the content server in response to the polling request from the content server (415). The database where the event is stored in the cloud system can act as a queue of kind-ordered changes in states of objects. Each event can contain a snapshot of this state of object at that given time and the operation (e.g., the name of operation that modified the state). So, if a document was renamed, the event at the top level would say "rename event" and within it would show the current state of the object with its current name. Going one event back in time, the state of that object would have its previous name. Thus, an event can capture both an instruction and a snapshot of the state.

In some embodiments, the event service can be optimized for fast reads to ensure that, when many tenant clients are connected to it, it can quickly serve up events. With this mechanism, there would be no need to handle offline scenarios. That is, when a content server is offline, it does not send poll requests. Accordingly, all events will queue up on the event service server waiting for the content server to come back online.

As a non-limiting example, the polling request can be a Hypertext Transfer Protocol (HTTP) request. In some embodiments, the content server is operable to send a polling request from behind the firewall to the event service of the cloud system periodically. The poll interval can be determined by a content server administrator, or an optimal interval can be pre-set in the content server code.

The event includes information about the modification of the version of the item by the cloud system user. This information allows the content server to update its audit log to include the event (420). As a non-limiting example, the event can be a JavaScript Object Notation (JSON) object that describes a current state of the version of the item in the cloud system.

In some embodiments, the content server can interpret the event and determine whether to take any appropriate action (425). An example of an action can be updating the item managed by the content server in the enterprise computing environment to reflect the modification of the version of the item by the cloud system user such that the item managed by the content server in the enterprise computing environment is in sync with the version of the item in the cloud system.

In some cases, the content server can interpret the event and determine not to take any action. For example, a file deletion event may be generated when the version of the item is deleted from the cloud system. The content server may interpret this event and determine that no action is needed. That is, deletion of a shared version of managed content from the cloud system does not necessarily cause the content server to delete the managed content as well.

For bidirectional synching, a change to the item managed by the content server in the enterprise computing environment can, likewise, be communicated by the content server to the cloud system. In some embodiments, this can entail determining, by the content server, whether the item managed by the content server in the enterprise computing environment has been modified (e.g., by the content server user or any authorized user in the enterprise computing environment) and, responsive to the item managed by the content server in the enterprise computing environment having been modified, making an API call to the cloud system with a delta made to the item managed by the content server. This delta can reflect the change to the item managed by the content server in the enterprise computing environment. Responsive to the API call, the cloud system can update the version of the item in the cloud system to reflect the delta made to the item managed by the content server such that the version of the item in the cloud system is in sync with the item managed by the content server in the enterprise computing environment.

Figure 5:
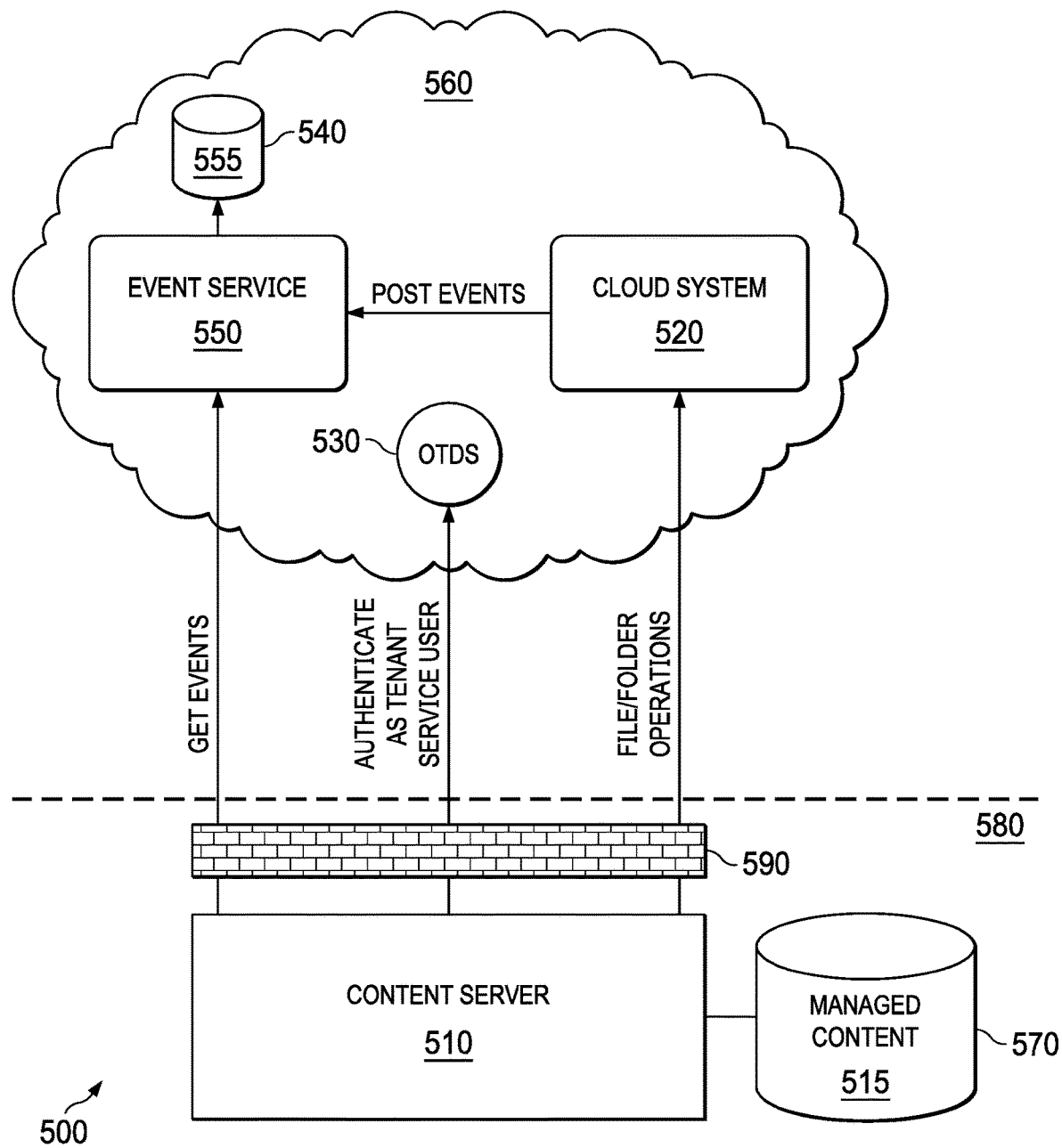
FIG. 5 depicts a diagrammatical representation of a content server operating behind a firewall in an enterprise computing environment and communicatively connected to a cloud system operating in a cloud computing environment according to some embodiments disclosed herein.

FIG. 5 depicts a diagrammatical representation of an example of architecture 500 showing a content server 510 operating behind a firewall 590 in an enterprise computing environment 580 and communicatively connected to a cloud system 520 operating in a cloud computing environment 560. In this example, an event service 550 can be part of the infrastructure of cloud computing environment 560 and can be configured for centrally handling events posted by cloud system 520 (including components thereof) in cloud computing environment 560. In some embodiments, a content server administrator has created an OAuth2 client and associated a tenant service user and configured a secure communication link to cloud system 520 so that content server 510 can authenticate with OTDS 530 and communicate with cloud system 520.

As illustrated in FIG. 5, there are no added components or configuration needed on the content server side. Content server 510 is operable to manage managed content 515 stored in repository 570 behind firewall 590 in enterprise computing environment 580. Further, content server 510 does not need to implement a new route to communicate with cloud system 520. Rather, content server 510 can utilize a standard network communication mechanism (e.g., HTTP GET) for getting events. As a non-limiting example, this mechanism may utilize JSON Web Token (JWT), in the same way as all other API accesses and no client state is persisted. This means that event configuration (e.g., event filtering, page size, etc.) is passed with each polling request. This can provide content server 510 with a greater control, through query parameters, over what types of events are returned with each poll request. Content server 510 communicates with event service 550 through a RESTful API provided by event service 550.

In some embodiments, each request may come with a stream position (which indicates the last consumed event) or the API will assume the most recent (pageSize) events are being requested. Each request can come with optional filter parameters (e.g., event type, event namespace, etc.) to tailor the result set.

From the perspective of event service 550, any authenticated user account may request events associated with their user account (e.g., tenant service users, standard users, etc.). No registration with the micro-service is required. However, only service users (e.g., cloud system components, other micro-services running on cloud system 520, etc.) can create new events (e.g., POST events). In some embodiments, event service 550 may store events 555 in an event store or database 540.

In some embodiment, database 540 can be implemented as a distributed, scalable, column-based database management system designed to handle large amounts of data. As a non-limiting example, database 540 can implement Apache Cassandra.

In some embodiments, database 540 can be configured with the following schema:

| property | type | description |
|---|---|---|
| namespace | string | name of event producer |
| userId | string | UUID (from OTDS) of target user, only this user can read this event |
| eventId | timeuuid | sortable, time based UUID |
| timestamp | int | event creation time, milliseconds since epoch |
| data | JSON | Producer-specific event content |

In some embodiments, event service 550 can retrieve events from database 540 for a particular namespace and userId (e.g., a page size of 100 is returned). In some embodiments, event service 550 can retrieve events for a particular namespace and userId from a provided eventId (timeuuid) (e.g., a page size of 100 is returned). In some embodiments, event service 550 can retrieve the latest event for a particular namespace and userId (e.g., to retrieve the latest eventId). From the perspective of content server 510, events coming from event service 550 can look like this:
CloudEvent MyOTDSUserId 12312412<some-JSON-payload>

A goal of this persistence is to have the fastest possible reads with reasonable write speeds. However, persisting events forever can lead to increased complexity (e.g., shard management may be needed for a large data set) and decreased performance. Accordingly, a maximum event retention time limit can be set by an application from where an event is generated. Alternatively, a namespace and type retention settings can be configured on the server (e.g., event service 550). Sync notifications are intended to be consumed either live, or after short client downtime. Therefore, notifications intended for sync could likely be purged after a week. This is one example type of retention setting. For non-sync related events, a longer (e.g., one month) retention period may be required.

Events can be generated for any action in cloud system 520, including events on all resource modification (to folders, documents, files, etc.). As a non-limiting example, on each event, there can be a namespace (e.g. "Core"), a type (e.g. "versionAdded"), and a user ID (e.g., an email address) such as the user for whom this event is intended. When an event is stored by the event service, it is given an event ID and a timestamp (e.g., milliseconds since epoch).

The content server (which is an example of a consumer of the event service—there can be other consumers) makes a poll request which includes their JVVT (which contains the user information) and a namespace, as well as optional list of event types. The content server will only receive events for its user accounts. Events on files and/or folders in the cloud system that are not associated with the account will not be communicated to the content server. If the "shared-to" user is not a collaborator (e.g., the user can only view a folder or a document), no events occurring in the cloud system that pertain to the view-only user would need to be synced (as there is no need to update the original content in the content server.

In some embodiments, any suitable backend system (e.g., an authenticated service) can consume (e.g., through an event stream) events from event service 550 so long as they can understand the format/property of event service 550. In some embodiments, event service 550 can implement a unified API schema described below. It can be up to each consumer to consume the event stream, perhaps filter the events, interpret the events, and take action on the events in the event stream. Event service 550 can notify such backend systems of all the changes occurring on cloud system 520 by external parties as events so that these backend systems can get the events from event service 550 and update their local representations based on the instruction and the state contained in each event.

To receive the sync events notifications from event service 550, content server 510 is operable to poll event service 550. Following the existing OAuth2 flow, content server 510 authenticates as the previously configured tenant service user and is responsible for keeping this session alive via the refresh token. In some embodiments, content server is operable to poll event service 550 every 1-5 seconds to check for events to minimize latency in synching changes. All events generated by event producers (e.g., cloud system 520 and components/services thereof) and sent to event service 550 are stored. When polling for events, all requested events (e.g., paged) are returned and event service 550 guarantees that no events are missed.

Figure 6:
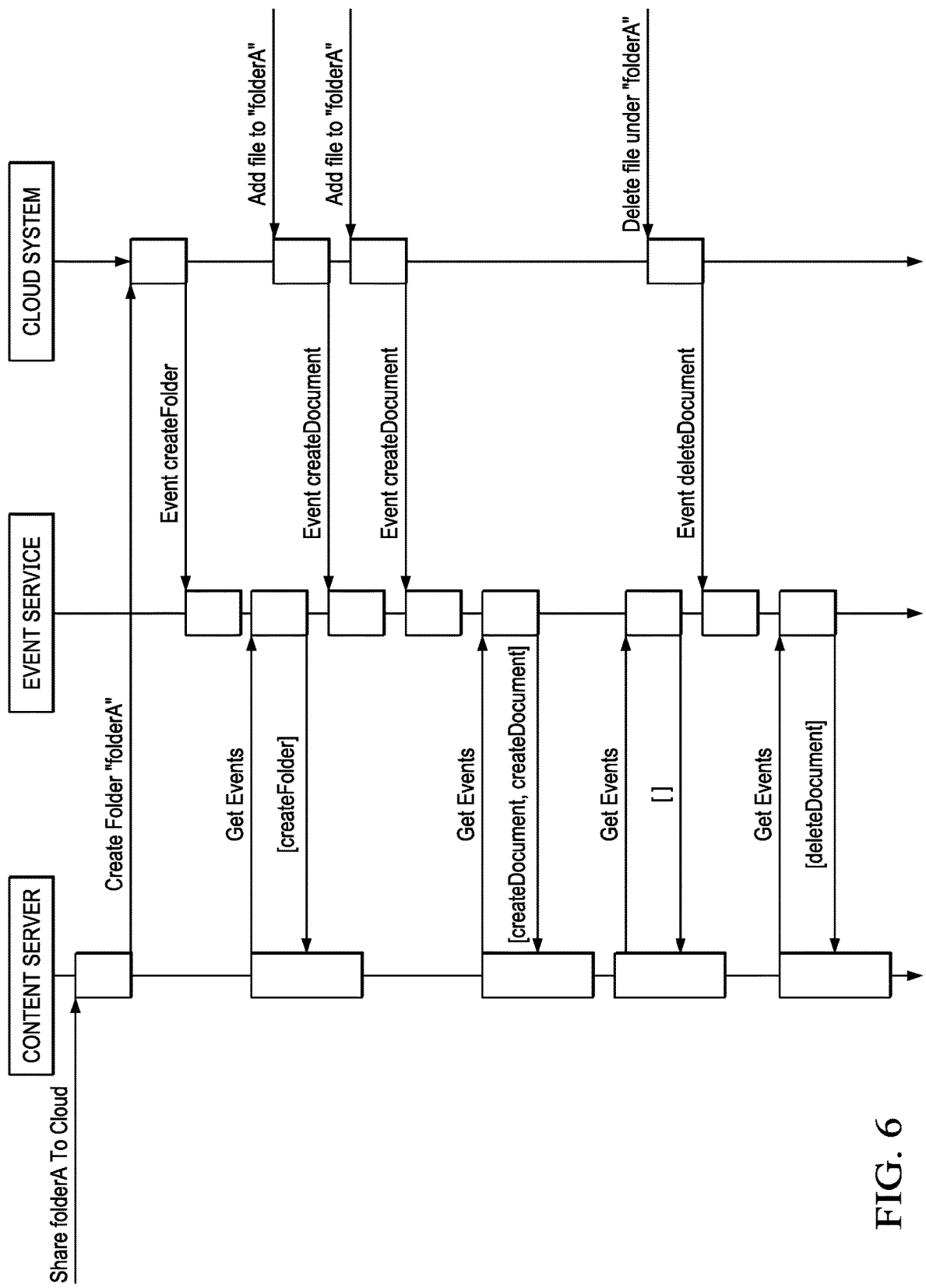
FIG. 6 depicts an example of an event sequence diagram illustrating how an event service can operate as an intermediary between a content server in an enterprise computing environment and a cloud system in a cloud computing environment according to some embodiments disclosed herein.

FIG. 6 depicts an example of an event sequence diagram illustrating how an event service can operate as an intermediary between a content server in an enterprise computing environment and a cloud system in a cloud computing environment. In this example, in response to a content server's indication to share "folderA" to the cloud system, the content server communicates with the cloud system directly to instruct the cloud system to create "folderA" in the cloud system. The cloud system creates "folderA" and generates a folder creation event. This event is posted to the event service, which is then polled by the content server. In response to the poll request ("GET Events") from the content server, the event service communicates the folder creation event to the content server. Meanwhile, files in "folderA" are added by the cloud system to the cloud version of the folder that the cloud system has created. Each time a file is added to the cloud folder by the cloud system, a corresponding event "createDocument" is posted to the event service. When the content server polls the event service again, these "createDocument" events are communicated by the event service to the content server. If no event has occurred since the last poll, the event service can return an empty response. If a file is deleted from the cloud version of the folder, a file deletion event "deleteDocument" is generated and communicated to the content server responsive to the next polling by the content server.

In some embodiments, the event service RESTful API can be configured to support the following HTTP requests:

GET /status—This performs a health check to determine whether the event service is up and ready to accept requests. A "HTTP200" response means that the event service is accessible. The status body (JSON) gives details of the health check and indicates if any dependencies are failing.

GET /events—This retrieves a list of events produced by the cloud system (event producer). The event producer can determine who the intended recipient of each event is. Thus, when querying this endpoint, the result set can be limited to the currently authenticated user (using the JVVT).

POST /events—This refers to an internal endpoint (within the cloud system) for the event producers (also within the cloud system) to send events. Events are stored for each user. Accordingly, this endpoint can accept an array of user IDs and one copy of the event is stored for each of the provided event payloads. If each user will see a different event, POST each unique event with a single element array containing the User ID of the intended recipient.

As a non-limiting example, the event service may support the following event types.

| type | corresponding notification type | object model included |
| --- | --- | --- |
| folder.deleted | feed.deletedFolder | folder |
| document.deleted | feed.deletedDocument | document |
| folder.renamed | feed.renamedFolder | folder |
| document.renamed | feed.renamedDocument | document |
| folder.moved | feed.movedFolder | folder |
| document.moved | feed.movedDocument | document |
| folder.created | feed.addedFolder | folder |
| document.created | feed.addedDocument | document |
| document.newVersion | feed.addedNewVersion | document |
| document.newDraft | feed.addedNewDraft | document |
| folder.copied | feed.addedFolderCopy | folder, folder |
| document.copied | feed.addedDocumentCopy | document, document |
| folder.restored | feed.restoredFolder | folder |
| document.restored | feed.restoredDocument | document |
| folder.shared | feed.sharedFolder | folder, user |
| document.shared | feed.sharedDocument | document, user |
| folder.unshare | feed.unshare | folder, user |
| document.unshare | feed.unshare | document, user |
| folder.leaveShare | feed.leaveShare | folder, user |
| document.leaveShare | feed.leaveShare | document, user |
| folder.permChange | feed.updateSharePermission | folder |
| document.permChange | feed.updateSharePermission | document |
| document.locked | feed.lockedDocument | document |
| document.unlocked | feed.unlockedDocument | document |

A non-limiting example of an API schema for the event service is provided below.

```
/status:
    get:
        summary: Basic health check of the service
        operationId: getStatus
        tags:
            - status
        responses:
            200:
                description: 200 response
                content:
                    application/json:
                        schema:
                            $ref: "#/components/schemas/Status"
/events:
    post:
        summary: Submit new event
        operationId: postEvent
        tags:
            - events
        requestBody:
            description: event details
            required: true
            content:
                application/json:
                    schema:
                        $ref: "#/components/schemas/EventCreation"
```

```
                    responses:
                        200:
                            description: 200 response, array of events created
                            content:
                                application/json:
                                    schema:
                                        type: array
                                        items:
                                            $ref: "#components/schemas/Event"
                        400:
                            description: Invalid Request
                        403:
                            description: Forbidden
                        500:
                            description: Server Failure, Do Not Retry
                        503:
                            description: Service Unavailable, Retry later
            get:
                summary: Get events
                operationId: getEvents
                tags:
                    - events
                parameters:
                    - in: query
                    name: nameSpace
                    required: true
                    schema:
                        type: string
                    description: Namespace of the event producer
                    - in: query
                    name: offset
                    schema:
                        type: integer
                    description: The ID of the last event retrieved from this endpoint
                    - in: query
                    name: limit
                    schema:
                        type: integer
                    description: Maximum number of events to return, maximum 100
                    responses:
                        200:
                            description: 200 response
                            content:
                                application/json:
                                    schema:
                                        type: array
                                        items:
                                            $ref: "#components/schemas/Event"
                        400:
                            description: Invalid Request
                        403:
                            description: Forbidden
                        500:
                            description: Server Failure, Do Not Retry
                        503:
                            description: Service Unavailable, Retry later
components:
    schemas:
        Status:
            properties:
                status:
                    type: string
                    example: good
                uptime:
                    type: integer
                    example: 120000000
        EventCreation:
            properties:
                nameSpace:
                    type: string
                    description: namespace of event producer
                    example: Core
                targetUsers:
                    type: list
                    example: [5217d048-f391-47f8-a7c0-4b995907a1be, cb554e27-a10b-44ef-aee2-3484141d46c1]
                data:
```

```
            $ref: "#components/schemas/EventData"
Event:
    properties:
        id:
            type: string
            description: unique identifier for event, timeuuid
            example: 6cced9b0-9a65-11e8-8080-808080808080
        timestamp:
            type: string
            description: time of event creation, milliseconds since epoch
            example: 1533662104267
        userId:
            type: string
            example: 5217d048-f391-47f8-a7c0-4b995907a1be
        nameSpace:
            type: string
            description: namespace of event producer
            example: Core
        data:
            $ref: "#components/schemas/EventData"
EventData:
    description: Core Specific Event Data
    properties:
        type:
            type: string
            example: "document.created"
        clientTraceId:
            type: string
            example: 5217d048-f391-47f8-a7c0-4b995907a34b
            description: client provided trace ID (X-OTF-Client-Trace-ID Header)
        object:
            $ref: "#components/schemas/CoreObject"
CoreObject:
    description: Resource Model (Document, Folder, Email, User, etc.)
    properties:
        resourceType:
            type: string
            example: document
        id:
            type: string
            example: 1046278100632999232
        name:
            type: string
            example: fileA.doc
        uri:
            type: string
            example: /api/v1/documents/1046278100632999232
CoreDocument:
    description: Document Resource
    properties:
        resourceType:
            type: string
            example: document
        currentVersionNumber:
            type: integer
            example: 5
        currentDraftNumber:
            type: integer
            example: 2
        id:
            type: string
            example: 1046278100632999232
        lastModified:
            type: string
            example: 2018-06-27T19:27:45.506Z
        name:
            type: string
            example: fileA.doc
        parentId:
            type: string
            example: 1046278100632999231
        size:
            type: string
            example: 1024
        uri:
            type: string
```

```
                example: /api/v1/documents/1046278100632999232
            isShared:
                type: boolean
                example: true
            owner:
                $ref: "#components/schemas/CoreUser"
            permission:
                type: string
                example: viewer
            currentVersionHash:
                type: string
                example: 065622AEEA0FD3B5C87DA7F4FCBC80A4716BDDD5
    CoreFolder:
        description: Folder Resource
        properties:
            resourceType:
                type: string
                example: folder
            id:
                type: string
                example: 1046278100632999232
            lastModified:
                type: string
                example: 2018-06-27T19:27:45.506Z
            name:
                type: string
                example: folderA
            parentId:
                type: string
                example: 1046278100632999231
            size:
                type: string
                example: 5
            uri:
                type: string
                example: /api/v1/folders/1046278100632999232
            isShared:
                type: boolean
                example: true
            owner:
                $ref: "#components/schemas/CoreUser"
            permission:
                type: string
                example: manager
    CoreUser:
        description: User Resource
        properties:
            resourceType:
                type: string
                example: user
            id:
                type: string
                example: 1046278100632999232
            firstName:
                type: string
                example: Kenji
            lastName:
                type: string
                example: Nakamura
            tenantId:
                type: string
                example: 1046278100632999231
            email:
                type: string
                example: knak@example.com
            uri:
                type: string
                example: /api/v1/users/104 6278100632999232
```

In the API schema described above, Core is used as a non-limiting example of an external system. The API schema described above can be very flexible in that the top layer only needs to indicate a producer of the event (e.g., the name of the producer) and the consumer it is intended to consume this event (e.g., the ID of the consumer). Everything else in the API schema can be up to the producer of the event to determine/configure. That is, two producers (e.g., two different subsystems within the cloud system) can produce two different object models based on this unified API schema.

Figure 7B:
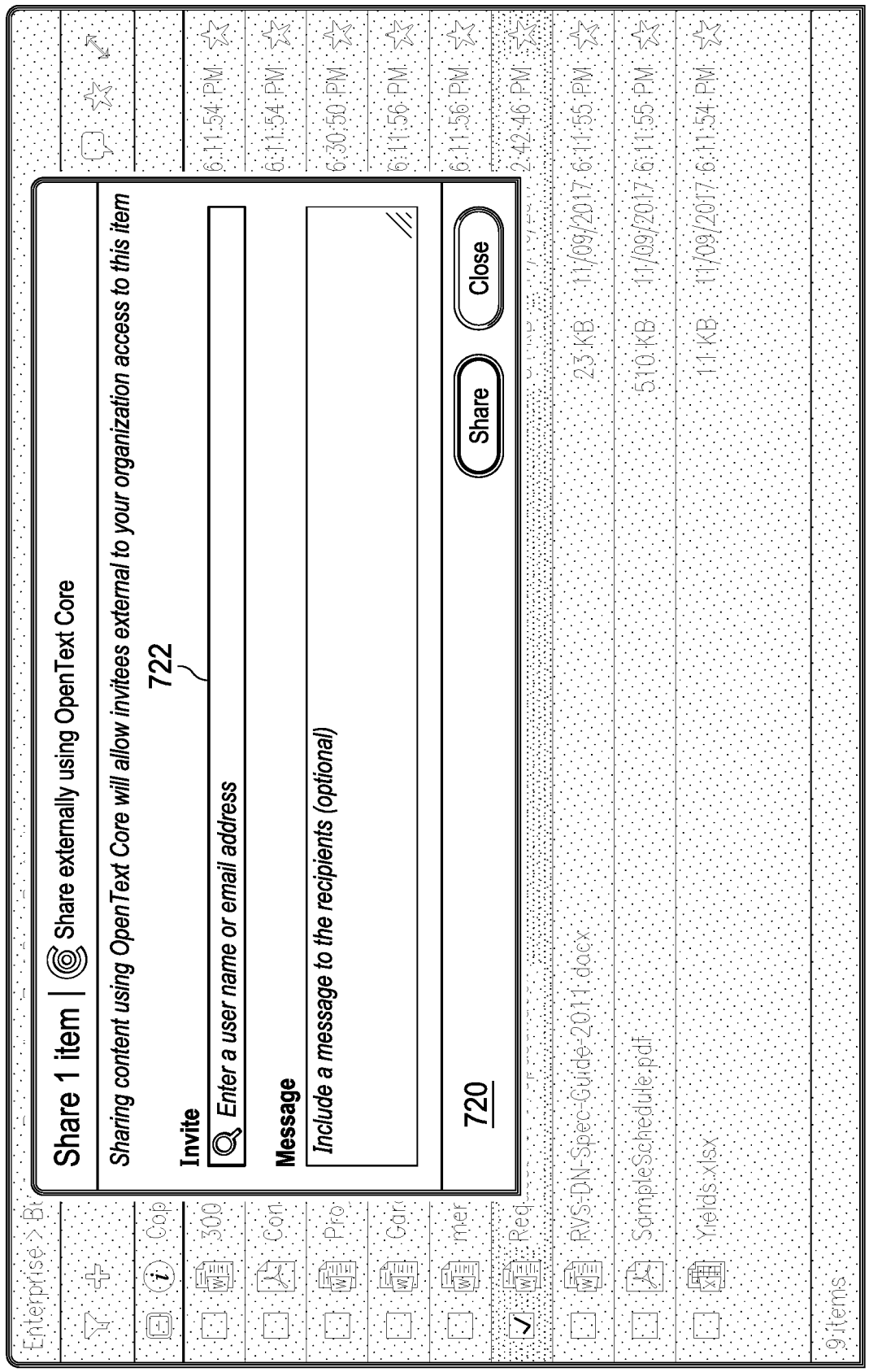
Figure 7C:
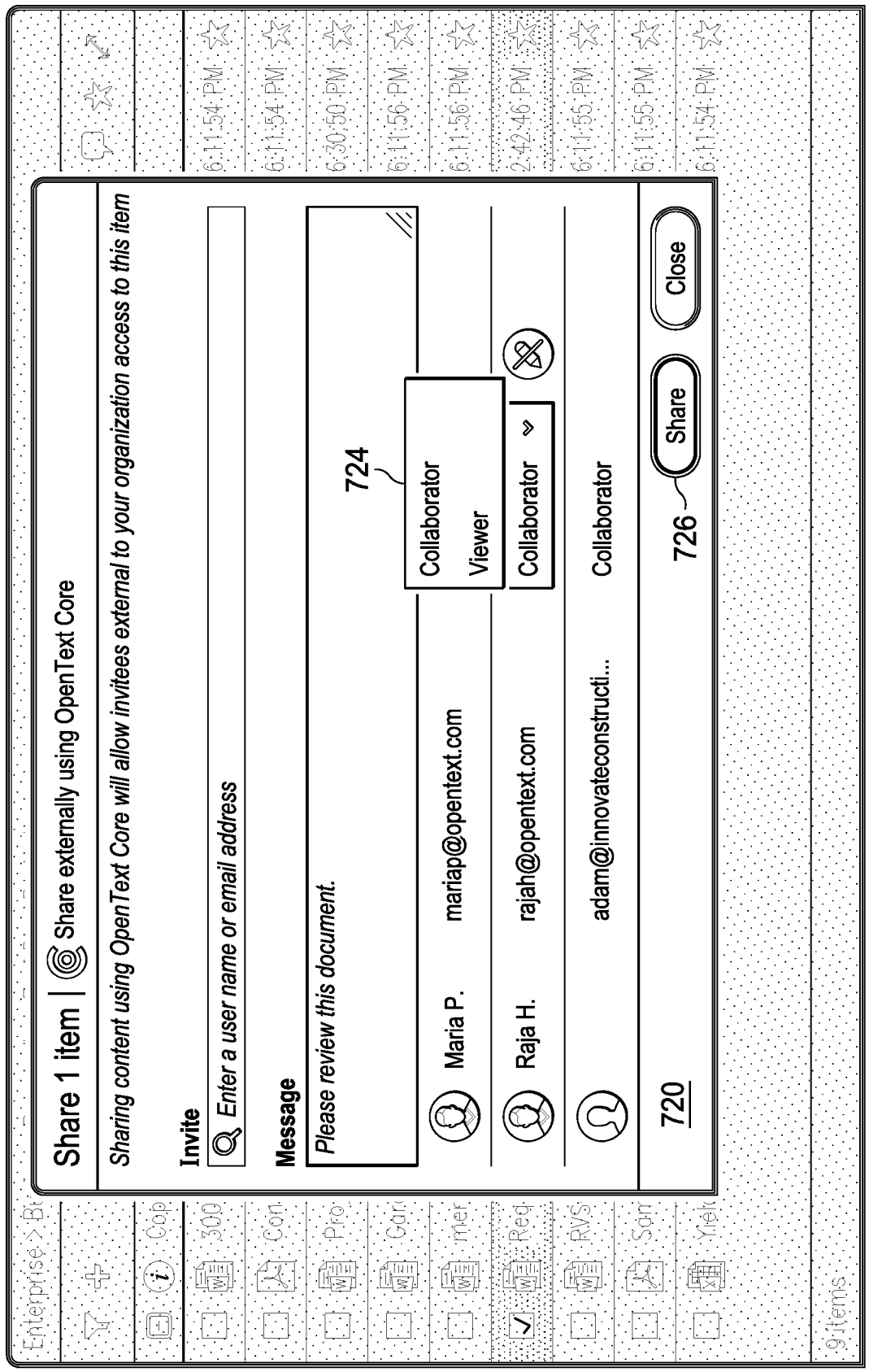

FIGS. 7A-7C depict diagrammatical representations of exemplary views of UI 700 of a content server with external sharing function 710 according to some embodiments disclosed herein. In the example of FIG. 7A, external sharing function 710 provides different sharing solutions 712, 714 for a content server user to share repository content managed by the content server, for instance, by emailing a link (712) or through an external system (714). In FIG. 7A, the content server user has selected file 701 for sharing. Since file 701 has not been shared before, it can be edited using edit function 730. In the example of FIG. 7A, file 706 had been shared, but is not locked or reserved by the content server.

Upon receiving an indication from the content server user (e.g., when external sharing 714 is selected), in some embodiments, the sharing module of the content server is operable to generate popup window or dialog box 720 with input fields (e.g., invite input field 722) for the content server user to specify or identify participant(s) (external and/or internal user(s)) with whom file 706 is to be shared (FIG. 7B). In some embodiments, a participant can be identified using an email address or email ID. In some embodiments, the content server is operable to communicate with the external system and provide type-ahead participant look-up as the originator types in a participant's information. As FIG. 7C illustrates, a participant can be an internal user or an external user and the originator can, using role assignment function 724 provided by the content server UI, assign a role ("Collaborator" or "Viewer") to each participant. Optionally, messages can be added to the invite email. Skilled artisans appreciate that, alternatively or additionally, other types of roles may also be utilized (e.g., "Contributor", "Reviewer," "Contractor," "Commentator," "editor," etc.). The originator can then indicate (e.g., by clicking or selecting "Share" button 726) to the content server that file 706 is ready for sharing with the identified participant(s). The originator can later add or remove a participant directly using the content server UI.

On selection of "Share" button 726, the content server makes a copy of file 706 and calls the external system. As discussed above, the external system is operable to notify all the participants identified by the originator through content server UI 700 and handle registration of any new user. The external system is also operable to notify all the participants when a new version of the copy is added to the external system (e.g., by one of the participants) or when something changes in the share.

Content server users wishing to share repository content from the content server should have a user account on the external system as well. In some embodiments, a content server user can authenticate to the external system using various authentication configurations of the external system supported by the content server.

All the operations on the external system are logged in a log file that is internal to the external system. Likewise, all operations on the content server are logged in a log file that is internal to the content server (e.g., audit log or tracking database 116). Previously, when a share is revoked, the shared item is synced back to the content server via the air gap and deleted from the external system. Any information logged on the external system about the item is lost forever. With embodiments disclosed herein, events occurring on the external system pertaining to the item can be synced back to the content server, allowing the content server to log the externally occurring events on the record for the item in the log file that the content server maintains behind the firewall. As such, no information is lost when the share is revoked, and the item is no longer shared through the external system.

While the content server can communicate with the external system directly through the API, the external system has no access to the content server. That is, the external system does not communicate, or initiate a communication, with the content server through a port in a firewall, behind which the content server operates. What the external system provides, in this case, is a notification to the content server that some event has occurred to a shared item. This notification is sent by the event service to the content server through a standard HTTP channel. All the operations are triggered and managed by the content server, including, for example, polling the event service, getting the events from the external system, updating an internal log to track the events, and, when the shared item is updated within the content server, communicating what has been changed to the external system. This allows content managed by the content server to be in both places (in the content server and the external system) at the same time, while allowing uses of both systems, one of which operates behind a firewall, to work on the shared content contemporaneously which, in turn, allowing for true collaboration without unnecessarily exposing the content server to network security risks.

Figure 8:
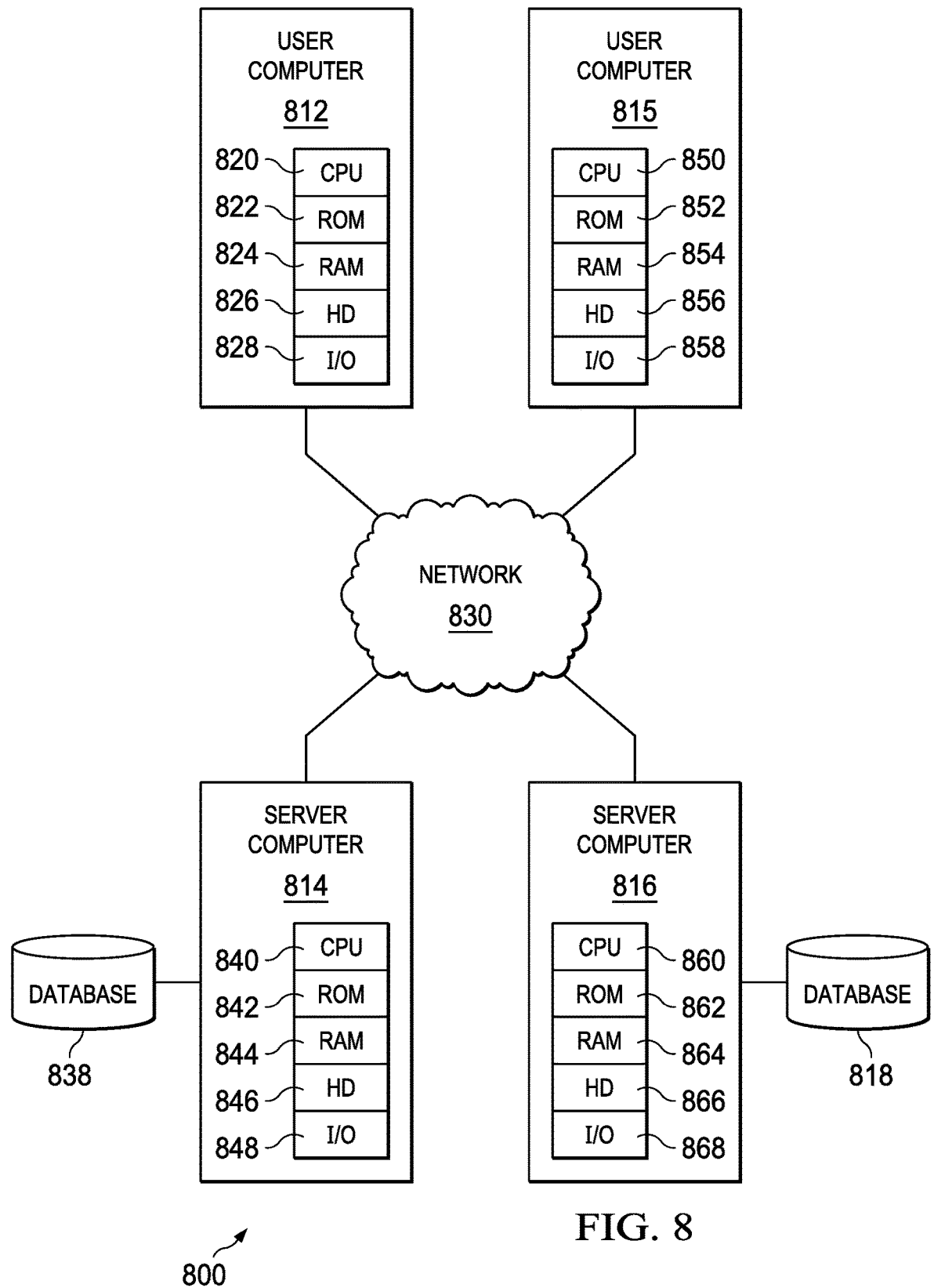
FIG. 8 depicts a diagrammatic representation of a distributed network computing environment where embodiments disclosed can be implemented.

FIG. 8 depicts a diagrammatic representation of a distributed network computing environment where embodiments disclosed can be implemented. In the example of FIG. 8, network computing environment 800 may include network 814 that can be bi-directionally coupled to user computer 812, user computer 815, server computer 814, and server computer 816. Server computer 814 can be bi-directionally coupled to database 838 and server computer 816 can be bi-directionally coupled to database 818. Network 830 may represent a combination of wired and wireless networks that network computing environment 800 may utilize for various types of network communications known to those skilled in the art.

For the purpose of illustration, a single system is shown for each of user computer 812, user computer 815, server computer 814, and server computer 816. However, within each of user computer 812, user computer 815, server computer 814, and server computer 816, a plurality of computers (not shown) may be interconnected to each other over network 830. For example, a plurality of user computers may be communicatively connected over network 830 to server computer 814 that operates an EIM system in an enterprise computing environment and a plurality of user computers may be communicatively connected over network 830 to server computer 816 implementing an external system external to the enterprise computing environment, the EIM system, and/or database 838 managed by the EIM system.

User computers 812 may include data processing systems for communicating with server computer 814. Likewise, user computers 815 may include data processing systems for communicating with server computer 816.

User computer 812 can include central processing unit ("CPU") 820, read-only memory ("ROM") 822, random access memory ("RAM") 824, hard drive ("HD") or storage memory 826, and input/output device(s) ("I/O") 828. I/O 829 can include a keyboard, monitor, printer, electronic pointing device (e.g., mouse, trackball, stylus, etc.), or the like. User computer 812 can include a desktop computer, a laptop computer, a personal digital assistant, a cellular phone, or nearly any device capable of communicating over a network. User computer 815 may be similar to user computer 812 and can comprise CPU 850, ROM 852, RAM 854, HD 856, and I/O 858.

Likewise, server computer 814 may include CPU 840, ROM 842, RAM 844, HD 846, and I/O 848 and server computer 816 may include CPU 860, ROM 862, RAM 864, HD 866, and I/O 868. Server computers 814 and 816 may each include one or more backend systems configured for providing an instance of an application to user computers 812 over network 830. Many other alternative configurations are possible and known to skilled artisans.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 812, 814, 815, and 816 is an example of a data processing system. ROM 822, 842, 852, and 862; RAM 824, 844, 854, and 864; HD 826, 846, 856, and 866; and database 818 and 838 can include media that can be read by CPU 820, 840, 850, or 860. Therefore, these types of memories include non-transitory computer-readable storage media. These memories may be internal or external to computers 812, 814, 815, or 816.

Portions of the methods described herein may be implemented in suitable software code that may reside within ROM 822, 842, 852, or 862; RAM 824, 844, 854, or 864; or HD 826, 846, 856, or 866. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method of bidirectional content synching and collaboration, the method comprising:

triggered by an instruction from an originator user of a content server to share an item with an external user of a cloud system, making an application programming interface (API) call to a cloud system, the API call made by the content server operating behind a firewall in an enterprise computing environment, the item managed by the content server behind the firewall, the cloud system operating in a cloud computing environment that is separate from, external to, and independent of the enterprise computing environment, the API call containing information identifying the originator user, the external user, and the item;

responsive to the API call from the content server, storing, by the cloud system, a version of the item for an account of the originator user in the cloud system, the version of the item in the cloud system accessible by the external user through an account of the external user in the cloud system, wherein the item is not locked by the content server such that the originator user and the external user can collaborate on the item contemporaneously;

responsive to the external user modifying the version of the item shared by the originator user, generating, by the cloud system, an event describing the modifying of the version of the item by the external user, the event comprising a snapshot of a state of the item and an identification of an operation used to modify the state;

storing the event in the cloud system until the content server polls the cloud system;

sending, by the content server from behind the firewall, a polling request to the cloud system;

responsive to the polling request from the content server, communicating the event describing the modifying of the version of the item by the external user to the content server, the communicating performed by an event service of the cloud system, the event service of the cloud system specifically configured to wait for the polling request from the content server and to communicate the event to the content server in response to the polling request from the content server;

updating, by the content server, an audit log to include the event;

updating, by the content server, the item managed by the content server behind the firewall in the enterprise computing environment to reflect the modifying of the version of the item by the external user such that the item managed by the content server in the enterprise computing environment is in sync with the version of the item in the cloud system;

determining, by the content server, whether the item managed by the content server in the enterprise computing environment has been modified;

responsive to the item managed by the content server in the enterprise computing environment having been modified, making an API call to the cloud system with a delta made to the item managed by the content server; and updating, by the cloud system responsive to the API call, the version of the item in the cloud system to reflect the delta made to the item managed by the content server such that the version of the item in the cloud system is in sync with the item managed by the content server in the enterprise computing environment;

wherein the version of the item in the cloud system is linked to the item managed by the content server through a revocable link, wherein in response to revocation of the revocable link, a last version of the item in the cloud system is retrieved and stored on the content server and the revocable link is severed.

2. The method according to claim 1, wherein the delta reflects a change made by the content server or a user of the content server to the item managed by the content server in the enterprise computing environment.

3. The method according to claim 1, further comprising:
responsive to each action by any external user permitted by the originator user to access the version of the item in the cloud system, generating, by the cloud system, an event describing the each action.

4. The method according to claim 3, further comprising:
storing events in a database of the cloud system; and
responsive to a polling request from the content server from behind the firewall of the enterprise computing environment, communicating, by the event service of the cloud system, the events to the content server.

5. The method according to claim 1, further comprising:
interpreting, by the content server, a file deletion event communicated to the content server by the event service of the cloud system responsive to a polling request from the content server from behind the firewall of the enterprise computing environment; and
determining, by the content server, whether to take any action on the file deletion event.

6. The method according to claim 1, wherein the polling request comprises a Hypertext Transfer Protocol (HTTP) request and wherein the event comprises a JavaScript Object Notation object that describes a current state of the version of the item in the cloud system.

7. The method according to claim 1, further comprising the originator user assigning a role to the external user for the share of the item.

8. The method according to claim 1, further comprising, by the cloud system, notifying the external user that the item has been shared with the external user when the version of the item is stored on the cloud system.

9. A system for bidirectional content synching and collaboration, the system comprising:

a content server operating behind a firewall in an enterprise computing environment, the content server having a processor, a non-transitory computer-readable medium, and stored instructions translatable by the processor, the content server communicatively connected to a cloud system in a cloud computing environment that is separate from, external to, and independent of the enterprise computing environment, the stored instructions when translated by the processor perform:

triggered by an instruction from a originator user to share an item with a external user, making an application programming interface (API) call to the cloud system, the item managed by the content server behind the firewall, the API call containing information identifying the originator user, the external user, and the item, wherein, responsive to the API call from the content server, the cloud system stores a version of the item for an account of the originator user in the cloud system, the version of the item in the cloud system accessible by the external user through an account of the external user in the cloud system, wherein the item is not locked by the content server such that the originator user and the external user can collaborate on the item contemporaneously, and wherein, responsive to the external user modifying the version of the item shared by the originator user, the cloud system generates an event describing the modifying of the version of the item by the external user, the event comprising a snapshot of a state of the item and an identification of an operation used to modify the state, wherein the event is stored in the cloud system until the content server polls the cloud system;

sending, from behind the firewall, a polling request to the cloud system, wherein, responsive to the polling request, an event service of the cloud system communicates the event describing the modifying of the version of the item by the external user to the content server, the event service of the cloud system specifically configured to wait for the polling request from the content server and to communicate the event to the content server in response to the polling request from the content server;

updating an audit log to include the event;

updating the item managed by the content server in the enterprise computing environment to reflect the modifying of the version of the item by the external user such that the item managed by the content server behind the firewall in the enterprise computing environment is in sync with the version of the item in the cloud system;

determining whether the item managed by the content server in the enterprise computing environment has been modified; and responsive to the item managed by the content server in the enterprise computing environment having been modified, making an API call to the cloud system with a delta made to the item managed by the content server, wherein, responsive to the API call, the cloud system updates the version of the item in the cloud system to reflect the delta made to the item managed by the content server such that the version of the item in the cloud system is in sync with the item managed by the content server in the enterprise computing environment;

wherein the version of the item in the cloud system is linked to the item managed by the content server through a revocable link, wherein the stored instructions when translated by the processor perform, in response to revocation of the revocable link, retrieving a last version of the item in the cloud system, storing last version of the item in the cloud system on the content server and severing the revocable link.

10. The system of claim 9, wherein the delta reflects a change made by the content server or a user of the content server to the item managed by the content server in the enterprise computing environment.

11. The system of claim 9, wherein the stored instructions when translated by the processor further perform:
sending a polling request from behind the firewall to the event service of the cloud system periodically.

12. The system of claim 9, wherein the stored instructions when translated by the processor further perform:
responsive to an instruction from the originator user to share a folder with the external user, making an API call to the cloud system, the API call containing information identifying the originator user, the external user, and a folder name, wherein the cloud system creates a cloud folder for the account of the originator user using the folder name and makes the cloud folder accessible by the external user through the account of the external user in the cloud system.

13. The system of claim 9, wherein the stored instructions when translated by the processor further perform:
interpreting a file deletion event communicated to the content server by the event service of the cloud system responsive to a polling request from the content server from behind the firewall of the enterprise computing environment; and
determining whether to take any action on the file deletion event.

14. The system of claim 9, wherein the polling request comprises a Hypertext Transfer Protocol (HTTP) request and wherein the event comprises a JavaScript Object Notation object that describes a current state of the version of the item in the cloud system.

15. A computer program product for bidirectional content synching and collaboration, the computer program product comprising a non-transitory computer-readable medium storing instructions translatable by a processor of a content server operating behind a firewall in an enterprise computing environment, the content server communicatively connected to a cloud system in a cloud computing environment that is separate from, external to, and independent of the enterprise computing environment, the instructions when translated by the processor perform:
triggered by an instruction from a originator user to share an item with a external user, making an application programming interface (API) call to the cloud system, the item managed by the content server behind the firewall, the API call containing information identifying the originator user, the external user, and the item, wherein, responsive to the API call from the content server, the cloud system stores a version of the item for an account of the originator user in the cloud system, the version of the item in the cloud system accessible by the external user through an account of the external user in the cloud system, wherein the item is not locked by the content server such that the originator user and the external user can collaborate on the item contemporaneously, and wherein, responsive to the external user modifying the version of the item shared by the originator user, the cloud system generates an event describing the modifying of the version of the item by the external user, the event comprising a snapshot of a state of the item and an identification of an operation used to modify the state, wherein the event is stored in the cloud system until the content server polls the cloud system;

sending, from behind the firewall, a polling request to the cloud system, wherein, responsive to the polling request, an event service of the cloud system communicates the event describing the modifying of the version of the item by the external user to the content server, the event service of the cloud system specifically configured to wait for the polling request from the content server and to communicate the event to the content server in response to the polling request from the content server;

updating an audit log to include the event;

updating the item managed by the content server behind the firewall in the enterprise computing environment to reflect the modifying of the version of the item by the external user such that the item managed by the content server in the enterprise computing environment is in sync with the version of the item in the cloud system;

determining whether the item managed by the content server in the enterprise computing environment has been modified; and responsive to the item managed by the content server in the enterprise computing environment having been modified, making an API call to the cloud system with a delta made to the item managed by the content server, wherein, responsive to the API call, the cloud system updates the version of the item in the cloud system to reflect the delta made to the item managed by the content server such that the version of the item in the cloud system is in sync with the item managed by the content server in the enterprise computing environment;

wherein the version of the item in the cloud system is linked to the item managed by the content server through a revocable link, wherein in response to revocation of the revocable link, a last version of the item in the cloud system is retrieved and stored on the content server and the revocable link is severed.

16. The computer program product of claim 15, wherein the delta reflects a change made by the content server or a user of the content server to the item managed by the content server in the enterprise computing environment.

17. The computer program product of claim 15, wherein the instructions when translated by the processor further perform:
sending a polling request from behind the firewall to the event service of the cloud system periodically.

18. The computer program product of claim 15, wherein the instructions when translated by the processor further perform:
interpreting a file deletion event communicated to the content server by the event service of the cloud system responsive to a polling request from the content server from behind the firewall of the enterprise computing environment; and
determining whether to take any action on the file deletion event.

19. The computer program product of claim 15, wherein the polling request comprises a Hypertext Transfer Protocol (HTTP) request and wherein the event comprises a JavaScript Object Notation object that describes a current state of the version of the item in the cloud system.

\* \* \* \* \*